United States Patent
Cossette

(10) Patent No.: US 7,264,428 B2
(45) Date of Patent: Sep. 4, 2007

(54) HOLE SAW AND CUTTER

(75) Inventor: Leonard R. Cossette, Bloomfield, CT (US)

(73) Assignee: Irwin Industrial Tool Company, Huntersville, NC (US)

( * ) Notice: Subject to any disclaimer, the term of this patent is extended or adjusted under 35 U.S.C. 154(b) by 20 days.

(21) Appl. No.: 11/135,043

(22) Filed: May 19, 2005

(65) Prior Publication Data

US 2006/0263156 A1    Nov. 23, 2006

(51) Int. Cl.
B23B 51/04    (2006.01)
(52) U.S. Cl. .................................. 408/204; 408/703
(58) Field of Classification Search ................ 408/79, 408/80, 201, 204, 206, 207, 209, 703, 203.5, 408/238, 239 R; B23B 51/04, 51/05
See application file for complete search history.

(56) References Cited

U.S. PATENT DOCUMENTS

| | | | |
|---|---|---|---|
| 1,283,258 A | 10/1918 | Misener et al. | |
| 1,354,830 A | 10/1920 | Janes, III | |
| 1,522,102 A | 1/1925 | Cibelli | |
| 2,140,192 A | 12/1938 | Thatcher | |
| 2,473,077 A * | 6/1949 | Starbuck, Jr. | 408/206 |
| 3,382,743 A * | 5/1968 | Trevathan | 408/145 |
| 3,559,513 A | 2/1971 | Hougen | |
| 3,565,179 A | 2/1971 | Paliani | |
| 3,609,056 A | 9/1971 | Hougen | |
| 3,648,508 A | 3/1972 | Hougen | |
| 3,709,627 A | 1/1973 | Elliott, Jr. | |
| 3,837,759 A * | 9/1974 | Bittern | 408/204 |
| 3,854,840 A | 12/1974 | Miyanaga | |
| 4,072,441 A | 2/1978 | LaPointe | |
| 4,077,737 A | 3/1978 | Morse | |
| 4,148,593 A | 4/1979 | Clark | |
| 4,261,673 A | 4/1981 | Hougen | |

(Continued)

FOREIGN PATENT DOCUMENTS

DE    3202024 A1    9/1982

OTHER PUBLICATIONS

Jun. 1999 "Rotabroach" Product Catalogue, Hougen Manufacturing, Inc., Swartz Creek, Michigan.

(Continued)

Primary Examiner—Daniel W. Howell
(74) Attorney, Agent, or Firm—McCarter & English, LLP

(57) ABSTRACT

A hole saw cap for a hole cutter, the cap includes a plate defining a substantially circular peripheral groove and an annular shelf extending radially outwardly from the peripheral groove, the peripheral groove has a recess and a threaded hole extending through a center of the plate. In addition, a hole cutter that includes a cap plate defining a substantially circular peripheral groove and an annular shelf extending radially outwardly from the peripheral groove. The peripheral groove has a recess. There is an elongated band forming an approximately circular shape with opposite ends of the band contacting each other. The band includes a base edge received within the circular peripheral groove in an abutting relationship with an inner edge of the groove and a weld region formed between the band and cap plate and fixedly securing the base edge of the band to the cap plate. The annular shelf of the cap plate extends radially outwardly of the base edge of the band.

25 Claims, 5 Drawing Sheets

U.S. PATENT DOCUMENTS

| | | | |
|---|---|---|---|
| 4,322,187 A | | 3/1982 | Hougen |
| 4,322,188 A | | 3/1982 | Hougen |
| 4,382,331 A | | 5/1983 | Kimura |
| 4,452,554 A | | 6/1984 | Hougen |
| 4,514,120 A | | 4/1985 | Hougen |
| 4,516,890 A | | 5/1985 | Beharry |
| 4,557,641 A | | 12/1985 | Hougen |
| 4,632,610 A | | 12/1986 | Hougen |
| 4,813,819 A | | 3/1989 | Hougen |
| 4,871,287 A | | 10/1989 | Hougen |
| 4,952,102 A | | 8/1990 | Hougen |
| RE33,440 E | | 11/1990 | Hougen |
| 5,076,741 A | * | 12/1991 | Littlehorn .................... 408/68 |
| 5,145,296 A | | 9/1992 | Hougen |
| 5,205,685 A | | 4/1993 | Herbert |
| 5,207,539 A | | 5/1993 | Mueller |
| 5,466,099 A | | 11/1995 | Sullivan et al. |
| 5,597,274 A | * | 1/1997 | Behner ....................... 408/204 |
| 5,803,677 A | | 9/1998 | Brutscher et al. |
| 5,803,678 A | | 9/1998 | Korb et al. |
| 5,865,571 A | * | 2/1999 | Tankala et al. ............. 408/1 R |
| 5,988,956 A | | 11/1999 | Omi et al. |
| 6,003,422 A | | 12/1999 | Holston |
| 6,158,324 A | | 12/2000 | Kullmann et al. |
| 6,167,792 B1 | | 1/2001 | Korb et al. |
| 6,276,248 B1 | | 8/2001 | Cranna |
| 6,588,992 B2 | | 7/2003 | Rudolph |
| 6,676,711 B2 | | 1/2004 | Omi |
| 6,939,092 B2 | * | 9/2005 | Korb et al. ................. 408/206 |

OTHER PUBLICATIONS

Undated product specification for "Holesaw 278-P", Miyanaga Co., Ltd, Wilmette, Illinois.

May 2002 "Lenox® Power Tool Accessories & Hand Tools" Product Catalogue, American Saw & Mfg. Company, East Longmeadow, Massachusetts.

* cited by examiner

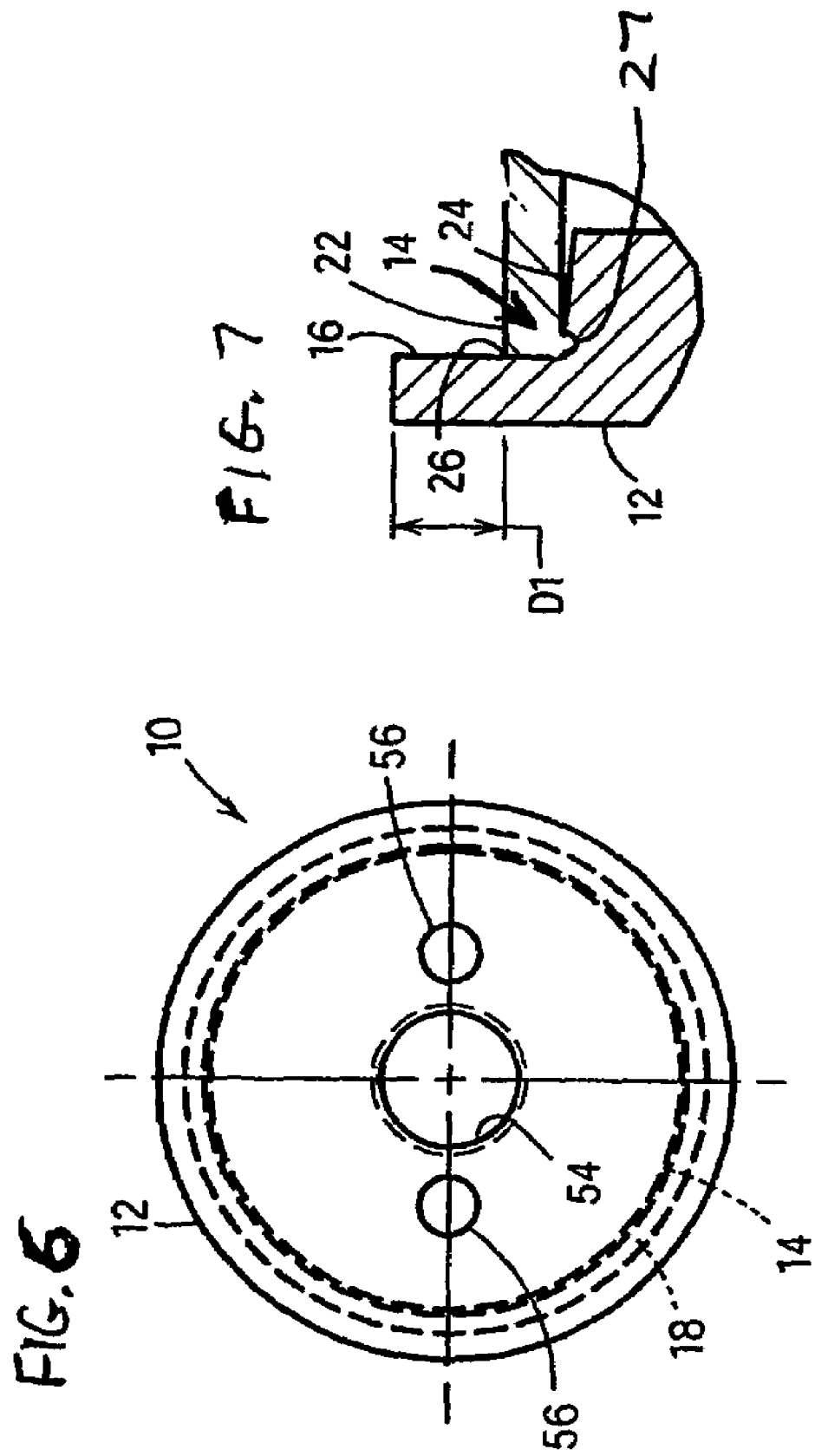

HOLE SAW AND CUTTER

FIELD OF THE INVENTION

The present invention relates to apparatus and methods for cutting holes, and more particularly, to hole cutters having circular metal bands welded to cap.

BACKGROUND INFORMATION

Typical prior art hole cutters, also known as hole saws, comprise a circular base, a peripheral wall formed on one side of the base and extending axially therefrom, and a plurality of cutting teeth machined in the outer edge of the peripheral wall. The base, peripheral wall and cutting teeth are machined from a piece of steel to form a hole cutter of unitary construction. An example of a hole saw is illustrated in U.S. Pat. No. 5,803,678, which is incorporated by reference herein in its entirety.

Some hole saws are manufactured by forming the saw teeth in an elongated metal band, and then welding the metal band in a circular configuration onto a rigid cap plate. The cap defines a peripheral flange and recess for receiving the band, and the band is welded to the cap at the junction of the flange and band. The band theoretically should be round, and should define either a chamfered or radiused inner corner in order to allow the band to fully engage the surfaces of the peripheral flange and recess of the cap, and thereby allow the band to be securely welded to the cap. In some cases, the bands can become "out of round" or otherwise mis-shaped during handling, and/or the inner edge of the bands may include burrs or may not define a correct chamfer or radius. In these situations, the band will not seat itself properly on the cap.

Accordingly, it is an object of the present invention to provide an improved hole cutter that overcomes one or more of the above-described drawbacks and/or disadvantages.

SUMMARY OF THE INVENTION

Exemplary embodiments of the invention include a hole cutter comprising a cap plate defining a substantially circular peripheral groove and an annular shelf extending radially outwardly from the peripheral groove. An elongated band of the hole cutter forms a closed, approximately circular shape with opposite ends of the band contacting each other. The band includes a base edge received within the circular peripheral groove in an abutting relationship with an inner edge of the groove. A weld region is formed between the band and cap plate and fixedly secures the base edge of the band to the cap plate. The cap plate defines an annular recess a shoulder of the peripheral groove. The recess can receive a burr, or otherwise allow a defective inner band edge (due, for example, to a lack of chamfer or radius or other mis-shape of the band) to sit properly on the cap.

Other objects and advantages of the hole cutters of the present invention will become more readily apparent in view of the following detailed description of the exemplary embodiments of the present invention and the accompanying drawings.

BRIEF DESCRIPTION OF THE DRAWINGS

FIG. 6 is a rear plan view of the hole cutter of FIG. 1; and

FIG. 7 is an enlarged partial, cross-sectional view of the hole cutter of FIG. 1 taken within the broken-line detail "7" of FIG. 2.

DETAILED DESCRIPTION

Figure 1:
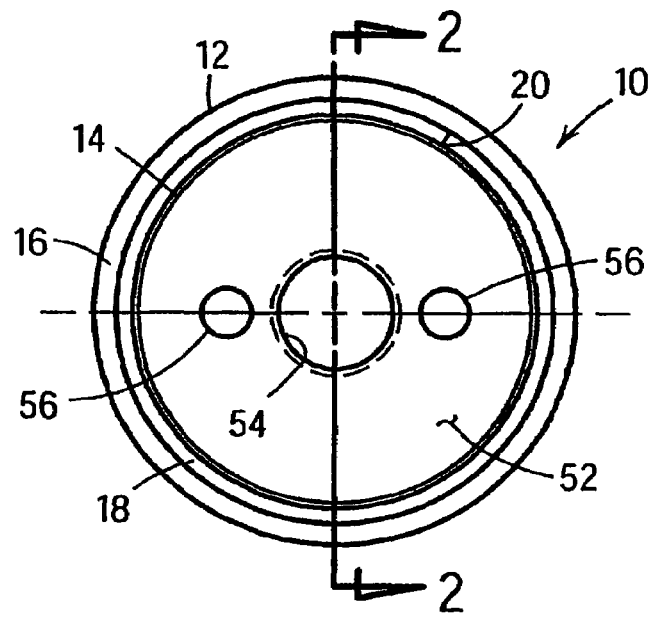
FIG. 1 is a front plan view of a hole cutter embodying the present invention.
Figure 2:
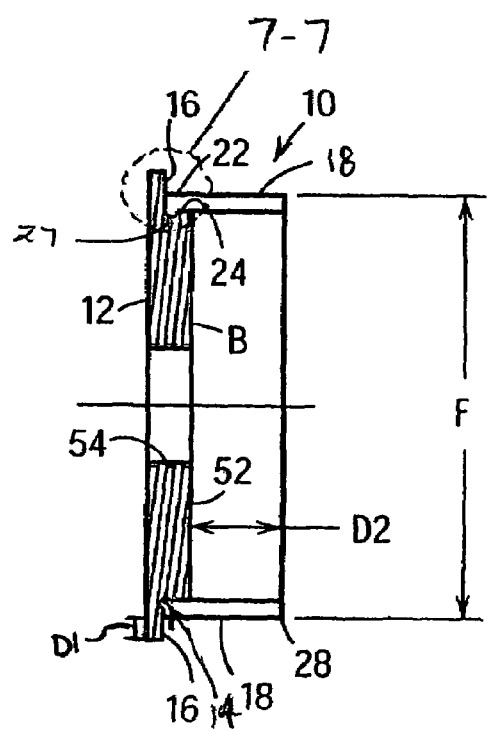
FIG. 2 is a cross-sectional view of the hole cutter of FIG. 1 taken along line 2-2 of FIG. 1.

Referring to FIGS. 1 and 2, a hole cutter embodying the present invention is indicated generally by the reference numeral 10. The hole cutter 10 comprises a cap plate 12 defining a substantially circular peripheral groove 14 and an annular shelf 16 extending radially outwardly from the peripheral groove. The hole cutter 10 further comprises an elongated band 18 forming an approximately circular shape with opposite ends of the band contacting each other along a line of joinder 20. The ends of the band are welded together along the line of joinder 20 to form the illustrated closed, circular shape. The band 18 includes a base edge 22 received within the circular peripheral groove 14 in an abutting relationship with an inner edge or shoulder 24 of the groove. An annular weld region 26 is formed between the base edge 22 of the band and the annular shelf 16 of the cap plate 12 to thereby fixedly secure the base edge of the band within the groove. The annular shelf 16 of the cap plate 12 extends radially outwardly of the base edge of the band and defines a radial depth "D1" between the outer edge of the shelf and the base edge of the band. In the currently preferred embodiments of the present invention, the radial depth D1 is at least approximately 1/16 of an inch, and is preferably within the range of about 1/16 of an inch through about 1/4 of an inch.

Figure 3:
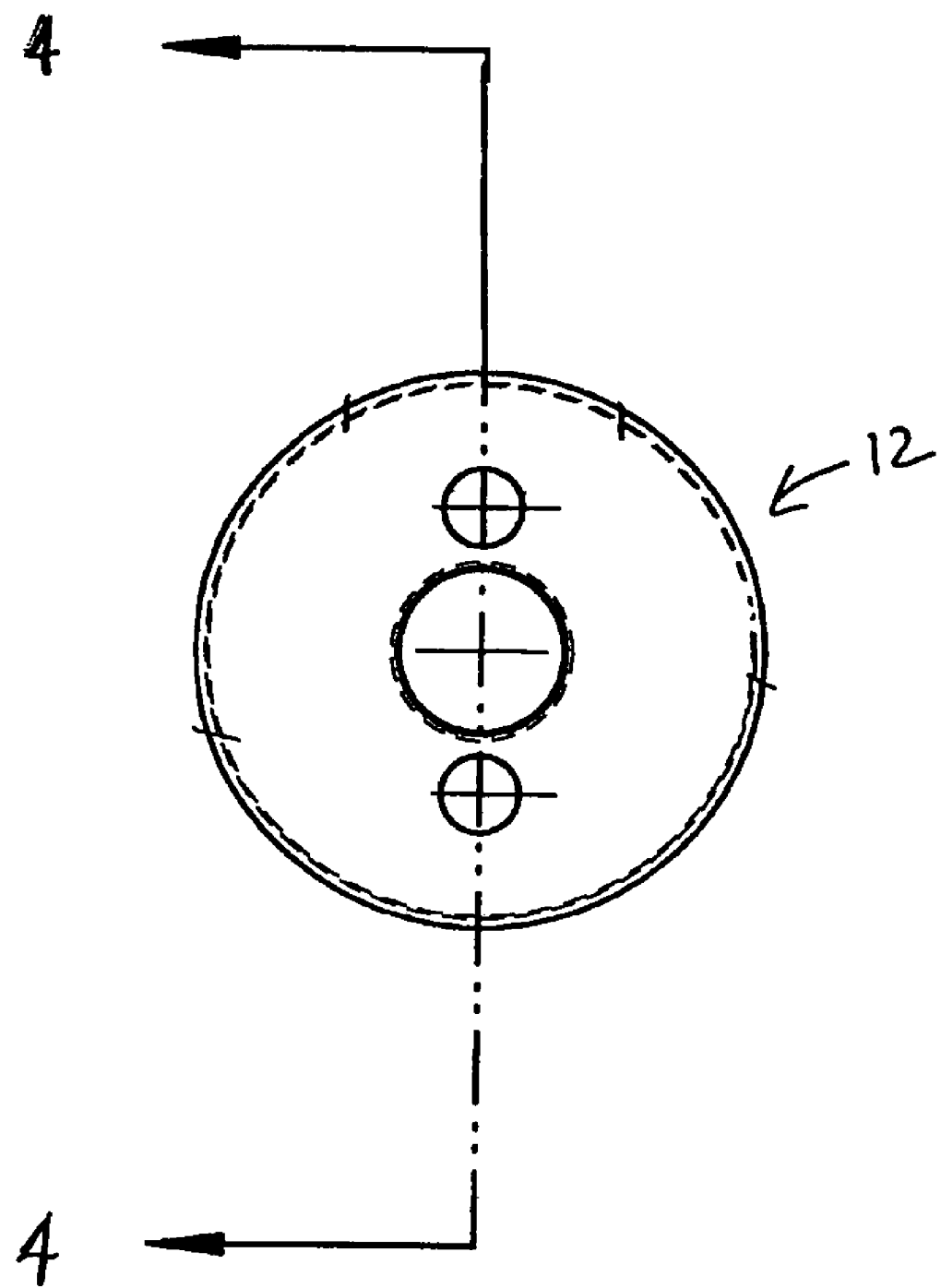
FIG. 3 is an enlarged plan view of the hole cutter cap plate of FIG. 1.
Figure 4:
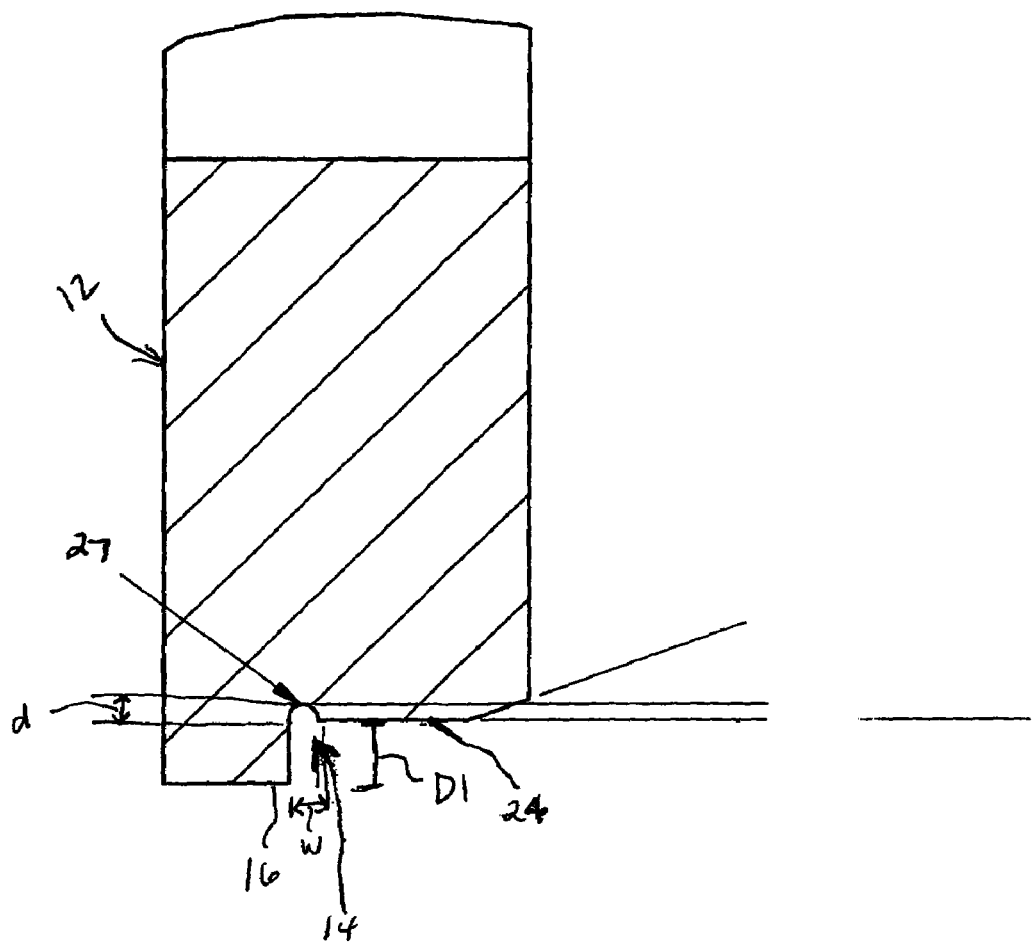
FIG. 4 is an enlarged partial, cross-sectional view of the cap plate of FIG. 3.

Referring to FIGS. 3 and 4, an enlarged plan view and cross-sectional area of the cap plate 12 is illustrated. Cap plate 12 includes an annular recess 27 is formed in the shoulder 24 at the peripheral groove 14. The recess 27 can be formed as any shape and is illustrated as semi-circle. In addition, the width w of the recess 27 ranges from about 0.01 inches to about 0.03 inches and the depth d of the recess ranges from about 0.01 inches to about 0.03 inches. The recess 27 is sized and placed on the shoulder 24 in manner so as to receive a burr or other formation that is located on the inner band edge 18. The recess 27 allows a defective inner band edge (due, for example, to a lack of chamfer or radius or other mis-shape of the band) to sit properly on the cap 12 so that a proper weld can be formed.

Figure 5:
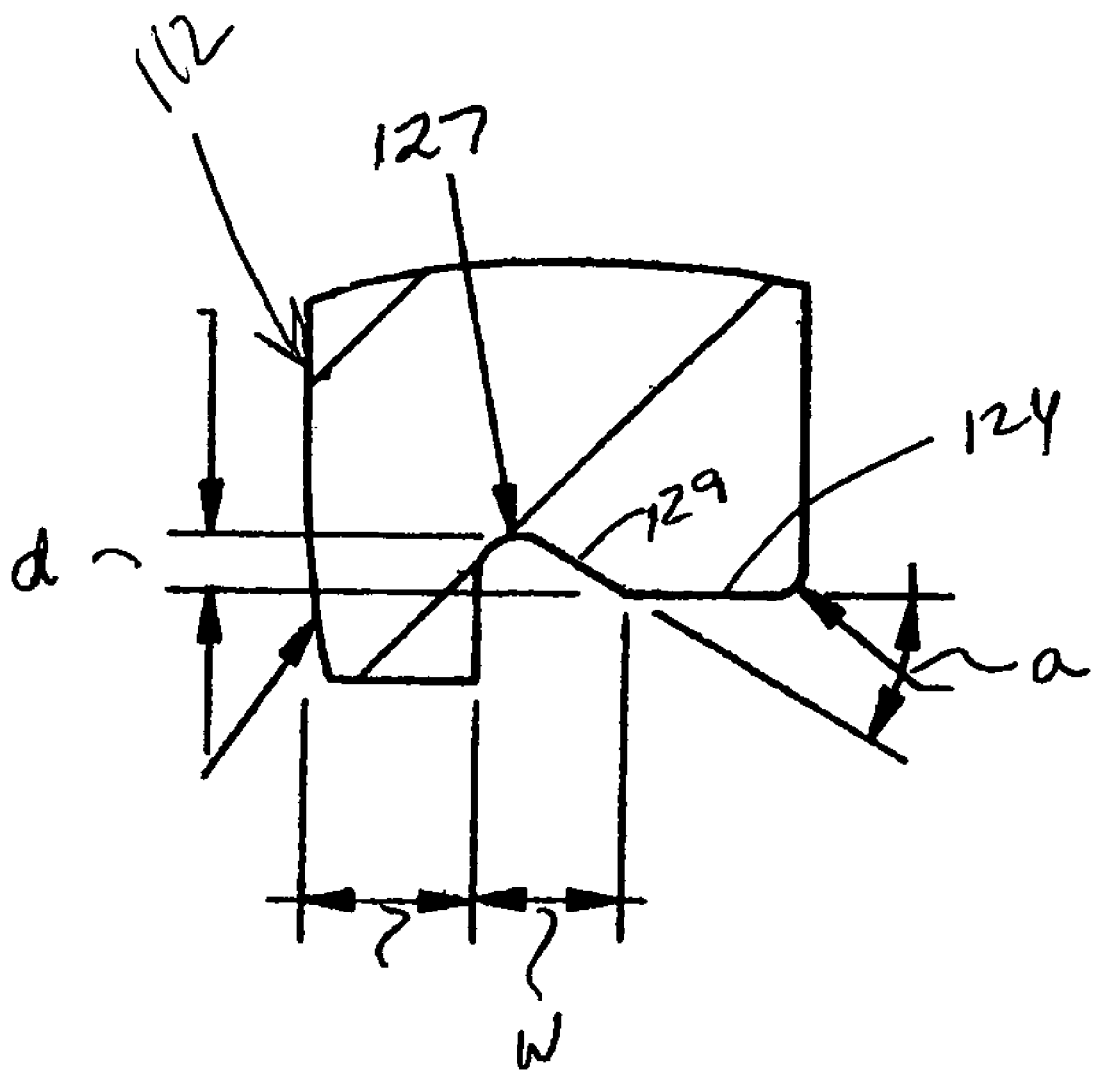
FIG. 5 is an alternative embodiment of partial, cross-sectional view of the cap plate of FIG. 3.

FIG. 5 an alternative embodiment of a partial, cross-sectional area of the cap plate 112 is illustrated. The cap plate 112 is similar in many respects to the 12 described above, the therefore like reference numerals preceded by the numeral 1 are used to indicate like elements. Cap plate 112 includes an annular recess 127 is formed in the shoulder 124 at the peripheral groove 114. The recess 127 can be formed as any shape and is shown having an angled side 129. The angle a, as measured from the shoulder 124 can range from about 28° to about 34°. In addition, the width w of the recess 127 ranges from about 0.04 inches to about 0.07 inches and the depth d of the recess ranges from about 0.01 inches to about 0.03 inches. The recess 127 is sized and placed on the shoulder 124 in manner so as to receive a burr or other formation that is located on the inner band edge (see FIG. 6). The recess 127 allows a defective inner band edge (due, for example, to a lack of chamfer or radius or other mis-shape of the band) to sit properly on the cap 112 so that a proper weld can be formed. In addition, recess 127 can be formed with a standard off the shelf carbide turning tool.

Hole saw cap 12, 112 can be used with all styles of hole saws, including bi-metal hole saws, carbide hole saws, one tooth hole cutters, sheet metal hole cutters, and grit edge hole saws.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A hole cutter, comprising:
   a cap plate defining a substantially circular peripheral groove and an annular shelf extending radially outwardly from the peripheral groove, the peripheral groove has a recess; and
   an elongated band forming an approximately circular shape with opposite ends of the band contacting each other, wherein the band includes:
   a base edge received within the circular peripheral groove in an abutting relationship with an inner edge of the groove; and
   a weld region formed between the band and cap plate and fixedly securing the base edge of the band to the cap plate, wherein the annular shelf of the cap plate extends radially outwardly of the base edge of the band.

2. A hole cutter as defined in claim 1, wherein the recess has a width of about 0.01 inches to about 0.03 inches.

3. A hole cutter as defined in claim 1, wherein the recess has a depth of about 0.01 inches to about 0.03 inches.

4. A hole cutter as defined in claim 1, wherein the recess is located at a shoulder of the peripheral groove.

5. A hole cutter as defined in claim 1, wherein the base edge has a burr and the recess is shaped to receive the burr.

6. A hole cutter as defined in claim 1, wherein the radial depth of the annular shelf is within the range of approximately 1/16 of an inch through approximately 1/4 of an inch.

7. A hole cutter as defined in claim 1, wherein the axial depth of the band is approximately 1/2 of an inch or less.

8. A hole cutter as defined in claim 1, wherein the peripheral groove defines an inner edge, and the inner edge is tapered radially inwardly in a direction from the base of the groove toward an inner surface of the cap plate to facilitate attachment of the band to the cap plate.

9. A hole cutter as defined in claim 1, wherein opposite ends of the band are welded together along a line of joinder.

10. A hole saw cap for a hole cutter, the cap comprising:
    a plate defining a substantially circular peripheral groove and an annular shelf extending radially outwardly from the peripheral groove, the peripheral groove has a recess; and
    a threaded hole extending through a center of the plate.

11. A hole saw cap as defined in claim10, further comprising two through holes formed on either side of the threaded hole.

12. A hole saw cap as defined in claim 10, wherein the recess has a width ranging from about 0.01 inches to about 0.03 inches.

13. A hole saw cap as defined in claim 10, wherein the recess has a depth ranging from about 0.01 inches to about 0.03 inches.

14. A hole saw cap as defined in claim 10, wherein the recess is located at a shoulder of the peripheral groove.

15. A hole saw cap as defined in claim 10, wherein the base edge has a burr and the recess is shaped to receive the burr.

16. A hole cutter, comprising:
    first means for forming a substantially circular peripheral groove and an annular shelf extending radially outwardly from the peripheral groove, the peripheral groove has a recess; and
    second means for forming a cutting edge and defining a circular shape with opposite ends that contact each other, wherein the second means includes:
    a base edge received within the circular peripheral groove in an abutting relationship with an inner edge of the groove;
    a weld region formed between the first means and the second means and fixedly securing the base edge of the second means to the first means, wherein the annular shelf of the first means extends radially outwardly of the base edge of the second means and defines a radial depth between the outer edge of the first means.

17. A hole cutter as defined in claim 16, where the first means is a cap plate.

18. A hole cutter as defined in claim 16, wherein the second means is an elongated metal band.

19. A hole cutter as defined in claim 16, wherein the recess has a width of about 0.01 inches to about 0.03 inches.

20. A hole cutter as defined in claim 16, wherein the recess has a depth of about 0.01 inches to about 0.03 inches.

21. A hole cutter as defined in claim 16, wherein the recess is located at a shoulder of the peripheral groove.

22. A hole cutter as defined in claim 16, wherein the second means has a burr and the recess is shaped to receive the burr.

23. A hole cutter as defined in claim 1, wherein the recess has a width of about 0.04 inches to about 0.07 inches.

24. A hole saw cap as defined in claim 10, wherein the recess has a width ranging from about 0.04 inches to about 0.07 inches.

25. A hole cutter as defined in claim 16, wherein the recess has a width of about 0.04 inches to about 0.07 inches.

* * * * *